(12) United States Patent
Nishikawa

(10) Patent No.: US 10,366,479 B2
(45) Date of Patent: Jul. 30, 2019

(54) TECHNIQUE FOR NORMALIZING SCINTIGRAPHY IMAGE

(71) Applicant: Nihon Medi-Physics Co., Ltd., Tokyo (JP)

(72) Inventor: Kazuhiro Nishikawa, Tokyo (JP)

(73) Assignee: Nihon Medi-Physics Co. Ltd., Tokyo (JP)

(*) Notice: Subject to any disclaimer, the term of this patent is extended or adjusted under 35 U.S.C. 154(b) by 5 days.

(21) Appl. No.: 15/569,442

(22) PCT Filed: Mar. 3, 2016

(86) PCT No.: PCT/JP2016/056550
§ 371 (c)(1),
(2) Date: Oct. 26, 2017

(87) PCT Pub. No.: WO2017/010119
PCT Pub. Date: Jan. 19, 2017

(65) Prior Publication Data
US 2018/0082409 A1 Mar. 22, 2018

(30) Foreign Application Priority Data
Jul. 14, 2015 (JP) .................................. 2015-140144

(51) Int. Cl.
*G06T 5/40* (2006.01)
*G01T 1/164* (2006.01)

(52) U.S. Cl.
CPC ................ *G06T 5/40* (2013.01); *G01T 1/164* (2013.01); *G01T 1/1647* (2013.01); *G06T 2207/10128* (2013.01); *G06T 2207/30008* (2013.01)

(58) Field of Classification Search
None
See application file for complete search history.

(56) References Cited

U.S. PATENT DOCUMENTS

| 5,577,089 A | 11/1996 | Mazess |
| 2007/0014470 A1* | 1/2007 | Sloan .................. G06T 5/009 |
| | | 382/162 |

(Continued)

FOREIGN PATENT DOCUMENTS

| JP | 2007-113945 | 5/2007 |
| JP | 2014009945 A | 1/2014 |

(Continued)

OTHER PUBLICATIONS

Shiraishi, Junji, et al., "Development of a computer-aided diagnostic scheme for detection of interval changes in successive whole-body bone scans", © 2007 Am. Assoc. Phys. Med., Med. Phys. 34, Jan. 2007, 12 pgs.

(Continued)

*Primary Examiner* — Tahmina N Ansari
(74) *Attorney, Agent, or Firm* — Harrington & Smith

(57) ABSTRACT

[Problem to be Solved] To improve stability of automatic normalization of a bone scintigraphy image.
[Solution] A preferred embodiment includes: creating a pixel value histogram of image data representing a bone scintigraphy image; setting a plurality of thresholds related to pixel values based on the pixel value histogram; calculating respective average pixel values for the set thresholds; arranging the calculated average pixel values in order from the largest value; and determining a reference value for normalizing the image data based on at least part of a set of the average pixel values arranged in the order. The determining the reference value includes: determining one straight line that approximates a region of small average pixel values out of the set of the average pixel values arranged in the order; and calculating the reference value based on the straight line.

18 Claims, 6 Drawing Sheets

(56) References Cited

U.S. PATENT DOCUMENTS

| | | | | |
|---|---|---|---|---|
| 2008/0298657 A1* | 12/2008 | Shiraishi | ................... | G06T 5/50 |
| | | | | 382/130 |
| 2011/0046451 A1* | 2/2011 | Horn | ..................... | G06T 7/0012 |
| | | | | 600/300 |
| 2018/0082409 A1* | 3/2018 | Nishikawa | .............. | G01T 1/164 |

FOREIGN PATENT DOCUMENTS

| | | |
|---|---|---|
| JP | 2014-048127 | 3/2014 |
| JP | 2015-064374 | 4/2015 |
| WO | WO 2007/062135 A2 | 5/2007 |

OTHER PUBLICATIONS

Giger, Maryellen Lissak, et al., "Image feature analysis and computer-aided diagnosis in digital radiography. 3. Automated detection of nodules in peripheral lung fields", © 1988 Am. Assoc. Phys. Med., Med. Phys. 15, Mar./Apr. 1988, 9 pgs.

* cited by examiner

TECHNIQUE FOR NORMALIZING SCINTIGRAPHY IMAGE

FIELD

The present invention relates to normalizing a scintigraphy image obtained by a nuclear medicine technique.

BACKGROUND

Scintigraphy used in nuclear medicine examinations is one type of nuclear medicine imaging techniques. In this technique, a radiopharmaceutical agent is administered into a subject's body, and gamma rays, which are emitted by decay of nuclides in the radiopharmaceutical agent, are captured by a single-photon emission computed tomography (SPECT) apparatus or other means and imaged. In scintigraphy, pixel values are normalized, that is, pixel values are converted to values comparable with those of other images, for the purposes of follow-up examinations, comparison among images, and others. Normalization methods include a manual method in which an operator visually performs level adjustment, and an automatic method in which normalization is performed automatically.

The manual method is advantageous in that it does not need any specific program; however, it is disadvantageous in that the results depend on the level of operator's techniques. For example, in the method of visually performing level adjustment, the results are subject to senses of an operator, which is likely to cause variations in the results. In another method, a region of interest (ROI) is defined on the thoracic spine and its maximum value is used for normalization. This method, however, is not usable when abnormal accumulation is present in the defined ROI.

Patent Literature 1 and Non Patent Literature 1 described below disclose techniques of semi-automatically determining a reference value for normalizing a bone scintigraphy image, which is a field of application of scintigraphy. These pieces of literature describe analyzing a histogram of a bone scintigraphy image using a multi-threshold method disclosed in the following Non Patent Literature 2, determining a boundary value between pixel values corresponding to abnormal accumulation of a radiopharmaceutical agent and pixel values corresponding to normal accumulation thereof, and normalizing the bone scintigraphy image using the boundary value as a reference.

LIST OF KNOWN PRIOR ART DOCUMENTS

Patent Literature

Patent Literature 1: WO2007/062135
Non Patent Literature 1: Shiraishi J et al., "Development of a computer-aided diagnostic scheme for detection of interval changes in successive whole-body bone scans," Med. Phys. 34, 25-36 (2007).
Non Patent Literature 2: M. L. Giger, K. Doi, and H. MacMahon, "Image feature analysis and computer-aided diagnosis in digital radiography. 3. Automated detection of nodules in peripheral lung fields," Med. Phys. 15, 158-166 (1988).

SUMMARY

According to the studies conducted by the inventor of the present application, however, the methods of Patent Literature 1 and Non Patent Literature 1 lack stability in normalization results in some cases. The inventor of the present application therefore intends to develop a technique for performing normalization in a more stabilized manner than conventional techniques, and has provided the invention of the present application.

The techniques in Patent Literature 1 and Non Patent Literature 1 have a feature of determining a reference value for normalization on the basis of a range of or values in a region having large pixel values. That is, the feature is to define a reference value on the basis of a region in which abnormal accumulation of a radiopharmaceutical agent is present. The inventor of the present application regards this feature as a cause of the lack of stability.

The inventor of the present application has found that the stability of normalization can be improved by defining a reference value for normalization on the basis of a region of normal accumulation.

An example of preferred embodiments of the invention of the present application is a method described as follows. This method is a method for normalizing a bone scintigraphy image obtained by a nuclear medicine technique. The method is characterized by including:
reading image data representing the bone scintigraphy image;
creating a pixel value histogram of the image data;
setting a plurality of thresholds related to pixel values based on the pixel value histogram;
calculating respective average pixel values for the set thresholds;
arranging the calculated average pixel values in order from a largest value; and
determining a reference value for normalizing the image data based on at least part of a set of the average pixel values arranged in the order, in which the determining the reference value includes:
determining one straight line that approximates a region of small average pixel values out of the set of the average pixel values arranged in the order; and
calculating the reference value based on the straight line.

In some embodiments, the determining the one straight line may include removing some large average pixel values from the set of the average pixel values, calculating an approximate straight line that approximates remaining average pixel values, and calculating a correlation coefficient between the approximate straight line and a set of the remaining average pixel values used for the calculation of the approximate straight line.

In some embodiments, the method may further include calculating the approximate straight line and the correlation coefficient for each variable number of the average pixel values removed, and determining the one straight line based on the calculated correlation coefficients.

In some embodiments, the region of small average pixel values may be determined based on a rate of change of values in the set of the average pixel values arranged in the order.

In some embodiments, the reference value may be determined based on an intercept of the straight line.

In some embodiments, the method may further include normalizing the image data based on the reference value and displaying the normalized image data.

In some embodiments, the setting the thresholds related to pixel values based on the pixel value histogram may be performed using a multi-threshold method.

Preferred embodiments of the invention of the present application include a system including: processing means; and storing means, the storing means storing therein a program instruction, in which the program instruction is configured to cause, when executed by the processing means, the system to execute any one of the methods described above.

Preferred embodiments of the invention of the present application include a computer program including a program instruction configured to cause, when executed by processing means in a system, the system to execute any one of the methods described above.

Preferred embodiments of the invention of the present application include a system described as follows. This system is a system for normalizing a bone scintigraphy image obtained by a nuclear medicine technique. The system is characterized by including:

means for reading image data representing the bone scintigraphy image;
means for creating a pixel value histogram of the image data;
means for setting a plurality of thresholds related to pixel values based on the pixel value histogram;
means for calculating respective average pixel values for the set thresholds;
means for arranging the calculated average pixel values in order from a largest value; and
means for determining a reference value for normalizing the image data based on at least part of a set of the average pixel values arranged in the order, in which the means for determining the reference value includes:
means for determining one straight line that approximates a region of small average pixel values out of the set of the average pixel values arranged in the order; and
means for calculating the reference value based on the straight line.

Several preferred embodiments of the present invention are specified in the appended claims. However, the embodiments specified in the claims do not necessarily include all the novel technical ideas disclosed in the description and the drawings of the present application. The applicant claims to possess the right to have a patent granted on all the novel technical ideas disclosed in the description and the drawings of the present application regardless of whether the novel technical ideas are claimed in the current claims.

DESCRIPTION OF EMBODIMENTS

The following describes the present invention in more detail using preferred examples, with reference to the accompanying drawings.

Figure 1:
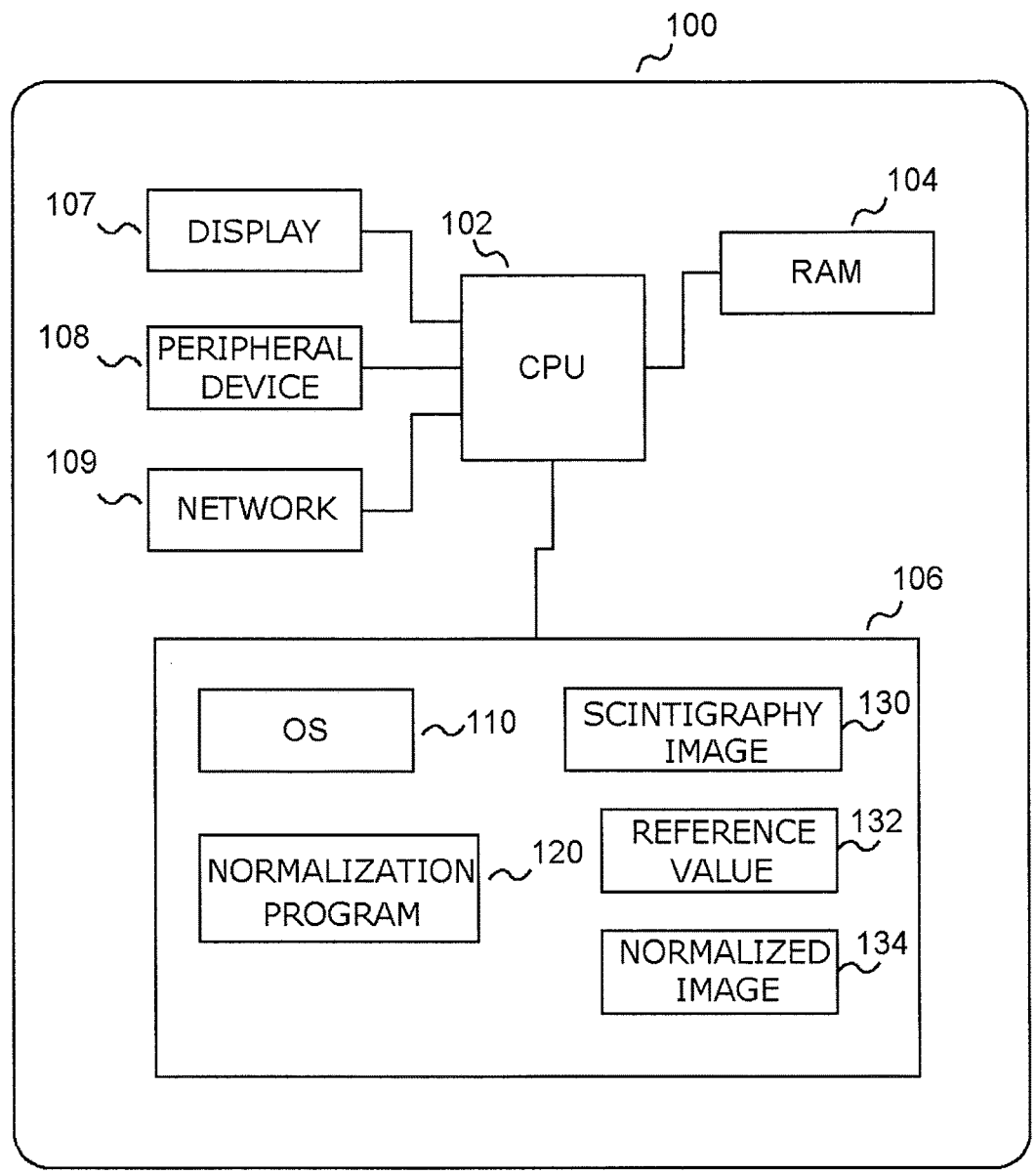
FIG. 1 is a diagram illustrating a main configuration of a system 100, which is exemplary hardware capable of executing various processes disclosed in the present description.

FIG. 1 is a diagram illustrating a main configuration of a system 100, which is exemplary hardware capable of executing various processes disclosed in the present description. As illustrated in FIG. 1, the system 100 is similar to a general-purpose computer in terms of hardware, and may include a central processing unit (CPU) 102, a main memory 104, a large-capacity storage unit 106, a display interface 107, a peripheral device interface 108, and a network interface 109, for example. Similarly to a general-purpose computer, a high-speed random access memory (RAM) may be used as the main memory 104, and an inexpensive, large-capacity hard disk or a solid state disk (SSD) may be used as the large-capacity storage unit 106. To the system 100, a display for displaying information may be connected through the display interface 107. Also to the system 100, a user interface such as a keyboard, a mouse, or a touch panel may be connected through the peripheral device interface 108. The network interface 109 may be used to connect the system 100 to another computer or the Internet via a network.

The large-capacity storage unit 106 may store therein, for example, an operating system (OS) 110 and an image normalization program 120 for providing characteristic processes disclosed in the present description. The most basic functions of the system 100 are provided when the CPU 102 executes the OS 110. In addition, the characteristic processes disclosed in the present description are provided when the CPU 102 executes at least part of a program instruction group contained in the image normalization program 120. As well known, embodiments of a computer program include various forms, and all of these variations are included in the scope of the invention disclosed in the present application.

The large-capacity storage unit 106 may further store therein, for example, bone scintigraphy image data 130 subject to normalization processing by the image normalization program 120, normalization reference value data 132 generated as a result of processing by the image normalization program 120, and normalized image data 134 obtained by normalizing the image data 130.

Other than the components illustrated in FIG. 1, the system 100 may include the same units as those of a general computer system, such as a power source and a cooling unit. Various embodiments of a computer system employing various techniques have been known, such as distributed, redundant, or virtualized storage units, use of multiple CPUs, CPU virtualization, use of a processor specialized for a specific process such as digital signal processing (DSP), and implementation of a specific process as hardware to be used with a CPU. The invention disclosed in the present application may be implemented in any form of computer system. The form of computer system does not limit the scope of the invention. The technical ideas disclosed in the present description may generally be embodied as: (1) a computer program containing an instruction configured to cause, when executed by processing means, an apparatus or a system including the processing means to execute various processes described in the present description; (2) a method for operating an apparatus or a system, the method being performed when the processing means executes the computer program; and (3) an apparatus or a system including the computer program and processing means configured to execute the computer program. As described above, part of software processing may be implemented as hardware.

Note that the pieces of data 130 to 134 are not stored in the large-capacity storage unit 106 in many cases at the time of manufacture, sales, and initial start-up of the system 100. The bone scintigraphy image data 130 may be transferred from an external apparatus to the system 100 through the peripheral device interface 108 or the network interface 109, for example. In some embodiments, the pieces of data 132 and 134 may be generated when the CPU 102 executes the computer program 120. In some embodiments of the computer program 120 or the OS 110, the pieces of data 132 and/or 134 are stored only in the main memory 104 instead of being stored in the large-capacity storage unit 106. Note that the scope of the invention disclosed in the present application is not limited by the existence of the pieces of data 130 to 134.

The following briefly describes the bone scintigraphy image data 130 subject to processing in examples disclosed in the present description. The bone scintigraphy image data 130 may be two-dimensional image data obtained, for example, by a single-photon emission computed tomography (SPECT) test performed by using a radiopharmaceutical agent that is absorbed in hydroxyapatite crystals, which are the basic composition of bone minerals. Specifically, for example, the bone scintigraphy image data 130 may be two-dimensional image data generated on the basis of radiation count values acquired by intravenously administering $^{99m}$Tc-HMDP as a radiopharmaceutical agent to a subject, and detecting radiation emitted from within the subject's body with a SPECT apparatus. In general, each pixel composing such an image has a value corresponding to a radioactivity count value; that is, each pixel value indicates the intensity of radioactivity. In some cases, the image data 130 may be time-series two-dimensional data, three-dimensional image data, or time-series three-dimensional data.

Figure 2:
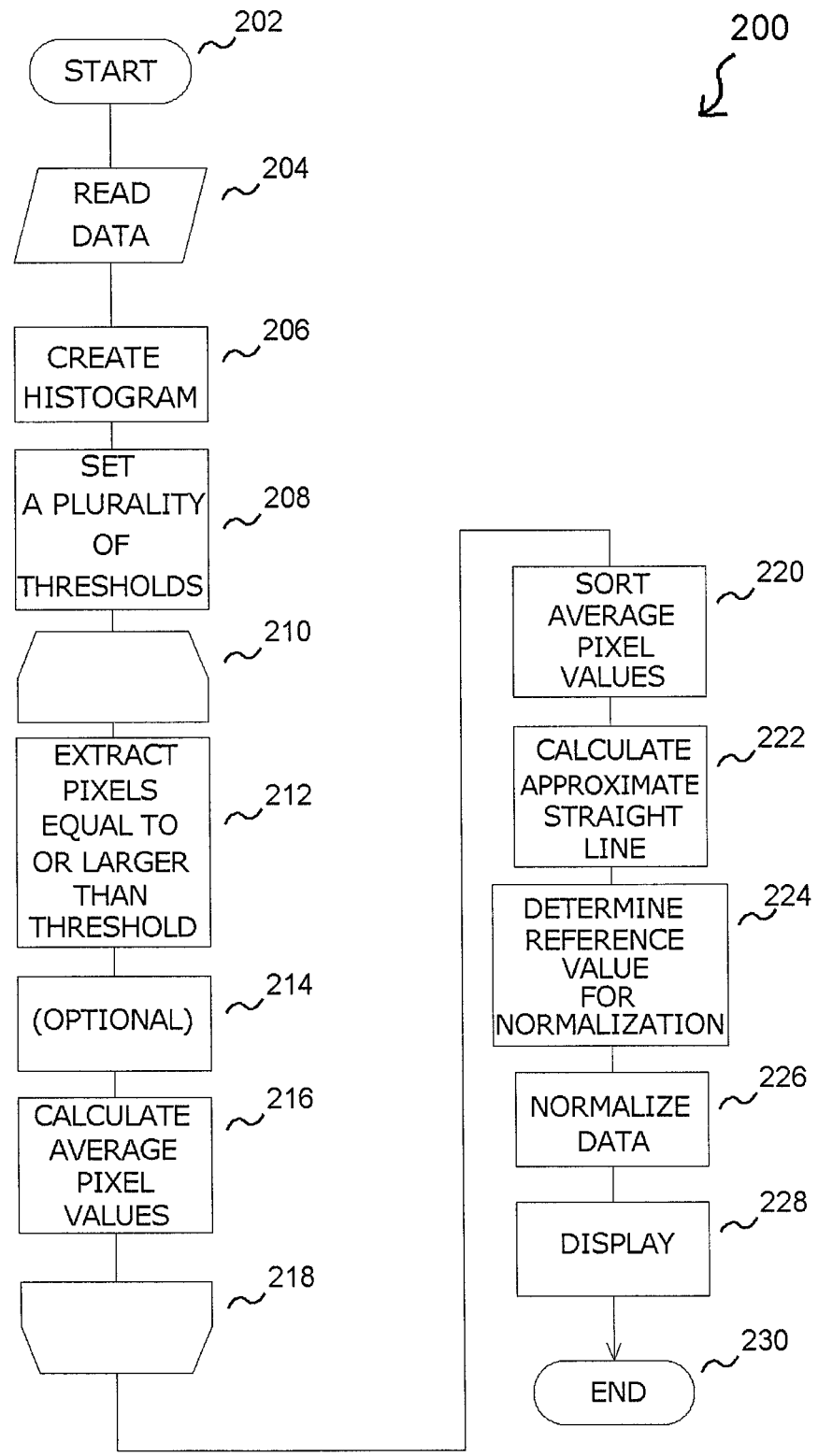
FIG. 2 is a flowchart illustrating image normalization processing disclosed in the present description.

The following describes the characteristic processes disclosed in the present description with reference to FIG. 2 and following diagrams.

FIG. 2 is a flowchart illustrating image normalization processing 200 disclosed in the present description. The processing described in this flowchart may be performed by the system 100 when the CPU 102 executes, for example, a program instruction of the image normalization program 120.

Step 202 indicates the start of processing. In step 204, the bone scintigraphy image data 130 subject to processing in the present example is read. For example, according to an instruction in the program instruction group contained in the image normalization program 120, the CPU 102 copies at least part of the image data 130 from the large-capacity storage unit 106 to the main memory 104.

In one embodiment, the bone scintigraphy image data 130 that has been stored on a storage medium may be read with a dedicated reading apparatus and captured into the system 100 through the peripheral device interface 108. In another embodiment, the bone scintigraphy image data 130 may be captured through the network interface 109 as data signals superimposed on carrier waves. In some examples, the captured bone scintigraphy image data 130 may be stored on the large-capacity storage unit 106 once and then copied to the main memory 104, or may be stored directly on the main memory 104 and provided directly to a later process.

Figure 3:
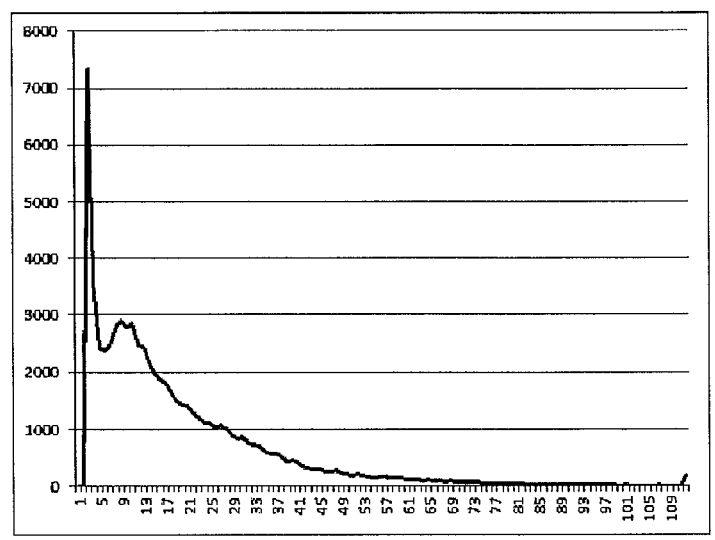
FIG. 3 is an exemplary pixel value histogram of a bone scintigraphy image.

In step 206, a histogram of pixel values of the image data 130 is created. Data of the created histogram may be stored in the main memory 104 or the large-capacity storage unit 106 for use in processes of subsequent steps, for display, or for other purposes. For reference, a pixel value histogram created from actual bone scintigraphy image data is shown in FIG. 3. The abscissa axis of the histogram indicates class values, which are values related to pixel values. The ordinate axis indicates frequency.

In step 208, a plurality of thresholds related to pixel values are set using the pixel value histogram created in step 206. In a preferred embodiment, a multi-threshold method is used to set a plurality of thresholds. Specifically, a plurality of thresholds are set as follows. First, a plurality of class values are obtained in such a manner that the area of the histogram from class value 0 to a certain class value equals to a certain percentage of the entire area of the histogram. For example, class value A1 is obtained in such a manner that the entire area of the histogram is segmented by 1%, and class value A1 corresponds to an area of 1%. Next, the segmentation ratio is incremented, for example, from 1% to 100% in increments of 1%, and class values A1, A2, . . . A100 corresponding to respective segmentation ratios are obtained. The obtained class values are used as thresholds. The method of defining a plurality of thresholds in such a manner and extracting certain pixels is referred to as a multi-threshold method.

In this example, frequencies would vary significantly around a peak of the histogram with a small difference between class values, and thus the difference between the values of class value $A_i$ and class value $A_{i+1}$ would be significantly small. In contrast, larger class values have a smaller difference in frequency and the frequency values of the larger class values are small, and thus the difference between the values of $A_i$ and $A_{i+1}$ would be relatively large.

In the loop indicated by block 210 to block 218, an average pixel value is calculated for each of the thresholds defined in step 208.

In step 212, a pixel group having pixel values equal to or larger than the threshold (e.g., $A_i$) in the current loop is extracted from the image data 130. Step 214 is an optional process, which will be descried later. In step 216, the average value of the pixel values in the pixel group extracted in step 212 is calculated. Step 212 and step 216 are repeated for all the thresholds defined in step 208 to calculate respective average pixel values. Results of the calculation may be stored in the main memory 104 or the large-capacity storage unit 106 for use in processes of subsequent steps, for display, or for other purposes.

In some embodiments, step 214 to be described in the following may be performed between step 212 and step 216.

In step 214, in the pixel group extracted in step 212, a cluster is formed by connecting pixels adjacent to each other. The number of pixels in each of the formed clusters is counted so as to specify pixels contained in a cluster in which the number of pixels does not satisfy a certain condition. When step 214 is performed, the pixels contained in the cluster not satisfying a certain condition may be excluded from the calculation of the average pixel value in step 216. As a specific example, the pixels contained in a cluster in which the number of pixels is 10 or smaller, for example, may be excluded from the calculation of the average pixel value in step 216. Alternatively, another process may be performed, such as excluding the pixels contained in a cluster in which the number of pixels is not in a certain range from the calculation of the average pixel value.

Figure 4:
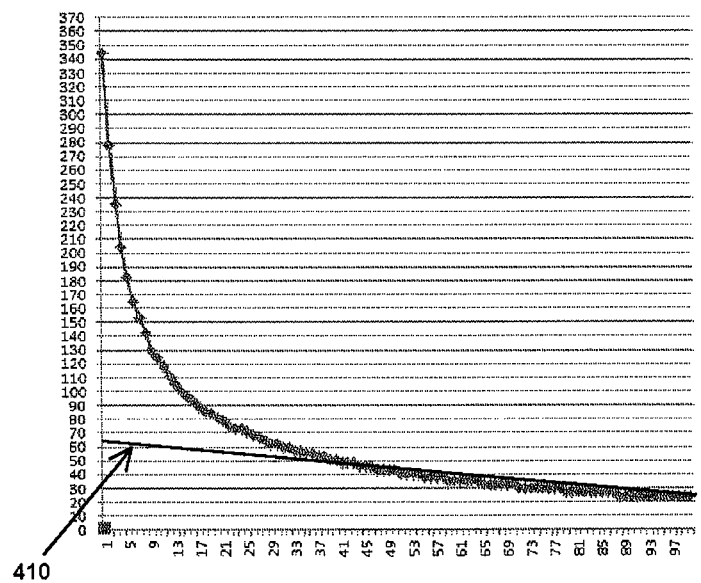
FIG. 4 is an exemplary graph of sorted average pixel values.

In step 220, a plurality of average pixel values calculated in the loop indicated by block 210 to block 218 are arranged in order from the largest value. That is, the values are sorted in descending order. Here, the sorted average pixel values may be displayed in a graph. An exemplary graph is illustrated in FIG. 4. The values on the abscissa axis are numbers that indicate the order of magnitude. For example, a point having a value of 1 on the abscissa axis in the graph has the largest average pixel value in all data points. Similarly, for example, a point having a value of 10 on the abscissa axis in the graph has the tenth largest average pixel value in all data points. A straight line 410 drawn in FIG. 4 will be described later in association with step 514 in FIG. 5.

In step 222, one straight line that approximates data of the sorted average pixel values is determined. The straight line can be displayed in a graph as illustrated in FIG. 4. The straight line determined here serves as a basis for calculating a reference value for normalizing the image data 130 in subsequent steps. It is important in step 222 to determine an approximate straight line by using data in a region of small average pixel values. A basic technical idea of the invention of the present application is to define a reference value for normalization on the basis of data of a region of normal accumulation in a scintigraphy image. In the graph of FIG. 4, a region of small average pixel values is the region of normal accumulation.

Methods for determining an approximate straight line of a plurality of data points have been known; however, efforts are needed to automatically use, as a region on the basis of which an approximate straight line is determined, a region of small average pixel values. A preferred embodiment of the present invention overcomes this problem by using an exemplary algorithm illustrated in FIG. 5.

Figure 5:
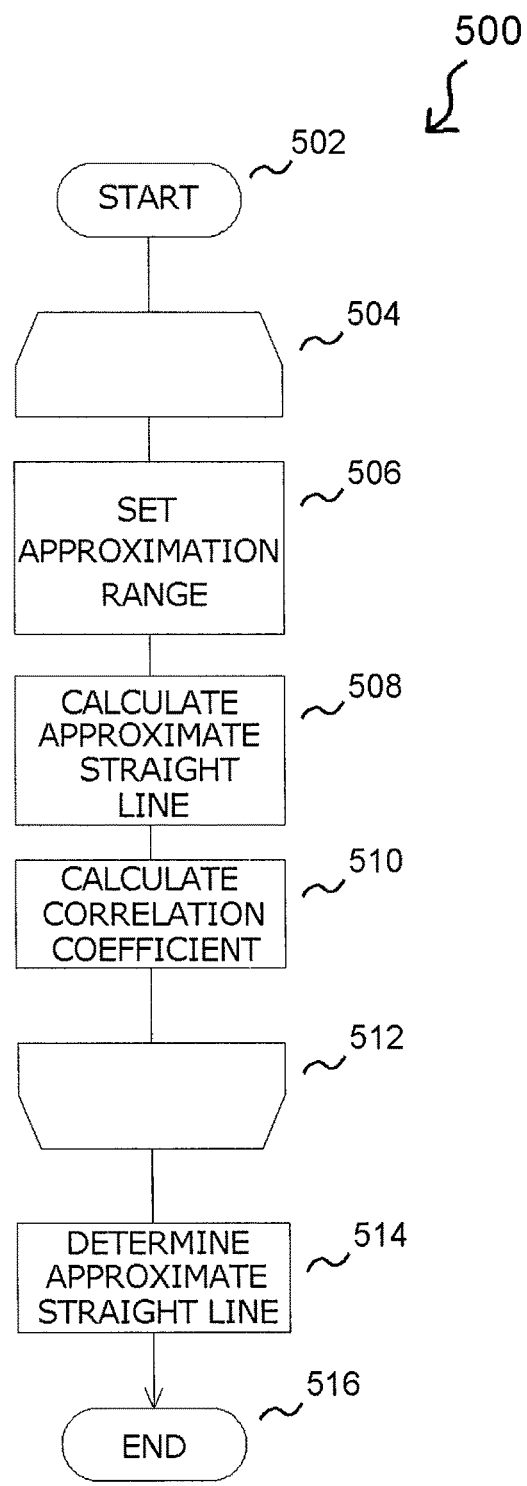
FIG. 5 is a flowchart illustrating exemplary processing for determining one straight line that approximates data of sorted average pixel values.

FIG. 5 illustrates an exemplary processing for determining one straight line that approximates data of sorted average pixel values. The straight line can be displayable in a graph as illustrated in FIG. 4. FIG. 5 is a flowchart illustrating exemplary processing 500 for determining an approximate straight line by automatically using a region of small average pixel values. Step 502 indicates the start of processing. Processes from block 504 to block 512 are performed in a loop. Every time the processing returns to 506, the data range used for calculating an approximate straight line in step 508 is changed. In step 508, an approximate straight line is calculated by using data in the range set in step 506. In step 510, a correlation coefficient between the approximate straight line determined in step 508 and data used for the calculation of the approximate straight line (i.e., data in the range set in step 506) is calculated.

In the present example, the setting of an approximation range in step 506 is performed as follows. First, when the processing 500 reaches 506 for the first time, the entire data range is set as the range used for calculating an approximate straight line. When the processing 500 returns to 506 next time, the range used for calculating an approximate straight line is reset, with the data point having the largest average pixel value excluded. When the processing 500 returns to 506 next time again, the range used for calculating an approximate straight line is reset, with the data point having the largest average pixel value in the previously used range excluded.

That is, for example, if 100 data points are present and are displayed in a graph as illustrated in FIG. 4, the data range to be set when the processing 500 reaches 506 for the first time would be 1 to 100 in the values on the abscissa axis. The data range to be set when the processing 500 returns to 506 next time would be 2 to 100 in the values on the abscissa axis. The data range to be set when the processing 500 returns to 506 next time would be 3 to 100 in the values on the abscissa axis. In step 508 and step 510, an approximate straight line and a correlation coefficient, respectively, are calculated for each range that has been set.

Note that, in some embodiments, the data range to be set when the processing 500 reaches 506 for the first time does not need to include the data point having the largest average pixel value, nor dose each data range need to include the data point having the smallest average pixel value. Furthermore, the number of data points included in a data range may have a lower limit. For example, in the above example, the data range to be set when the processing 500 reaches 506 for the first time may be 3 to 90 in the values on the abscissa axis, and the data range to be set immediately before the processing exits the loop indicated by block 504 to block 512 may be, for example, 81 to 90 in the values on the abscissa axis.

Thus, by the time when the processing exits the loop indicated by block 504 to block 512, a plurality of pieces of information on the ranges that have been set, information on respective straight lines, and information on respective correlation coefficients have been calculated. These pieces of information may be stored in the main memory 104 or the large-capacity storage unit 106 for use in processes of subsequent steps, for display, or for other purposes.

In step 514, one approximate straight line is determined on the basis of the pieces of information calculated in the loop 504 to 512. In one example, the straight line associated with the largest correlation coefficient in the loop 504 to 512 may be determined to be the one approximate straight line. The straight line 410 illustrated in FIG. 5 is a straight line determined by this method.

In another example, the straight line associated with the correlation coefficient indicating the first peak in the loop 504 to 512 may be determined to be the one approximate straight line in step 514. To determine a peak of correlation coefficients, appropriate smoothing processing may be applied before determining the peak. In some embodiments, the straight line associated with a later peak, such as the second or the third peak, than the first peak may be determined to be the one approximate straight line in step 514.

In another example, the straight line associated with a correlation coefficient determined to be exceeding a certain value in the loop 504 to 512 may be determined to be the one approximate straight line in step 514.

In any method, the data on the basis of which the determined straight line has been calculated corresponds to a region of small average pixel values. That is, in the graph of FIG. 4, the data on the basis of which the determined straight line has been calculated corresponds to a region of large values on the abscissa axis.

Step 516 indicates the end of the processing.

In step 222, methods for determining an approximate straight line are not limited to the methods described above. For example, in some embodiments, a predetermined range of data points in a graph as illustrated in FIG. 4 may be defined as the range in which the approximate straight line is calculated. For example, a range of the abscissa values that are 30% to 80% of the maximum abscissa value having a data point may be defined as the range in which the approximate straight line is calculated.

In another example, data is illustrated in a graph as in FIG. 4, and rates of change between adjacent data points are determined. The point at which the absolute value of the rate of change falls below a certain threshold may be defined as the lower limit of the range in which the approximate straight line is calculated. As shown in FIG. 4, the absolute value of the rate of change is large in a region of small values on the abscissa axis, and the absolute value gradually decreases as the value on the abscissa axis increases. Thus, by setting a sufficiently small threshold for the absolute value of the rate of change, such an approximation range that exclusively includes a region of small average pixel values can be set.

In step 224, a reference value for normalizing the data 130 is determined on the basis of the approximate straight line determined in step 222.

In one embodiment, this reference value corresponds to a value of y-intercept of the approximate straight line determined in step 222. Thus, in the case of the approximate straight line 410 exemplified in FIG. 4, this reference value is approximately 65.

In another embodiment, this reference value corresponds to the maximum value on the ordinate axis within a data range on the basis of which the approximate straight line has been calculated.

Methods for determining a reference value are not limited to the examples described above. In any case, however, it is necessary to determine a reference value on the basis of the approximate straight line determined in step 222.

The determined reference value may be stored in the main memory 104 or the large-capacity storage unit 106 for use in processes of subsequent steps, for display, or for other purposes.

In step 226, the bone scintigraphy image data 130 is normalized by using the reference value determined in step 224. In embodiments of the present invention, ways of using the reference value are not specifically limited, and a number of variations can be conceived. In one example, when the pixel value of each pixel in the bone scintigraphy image data 130 is normalized on a scale of 1 to 1024 for example, the entire values may be adjusted so that the reference value corresponds to a specific value (300 for example) on that scale. The normalized image data may be stored in the main memory 104 or the large-capacity storage unit 106 for use in further processes, for display, or for other purposes.

Figure 6A:
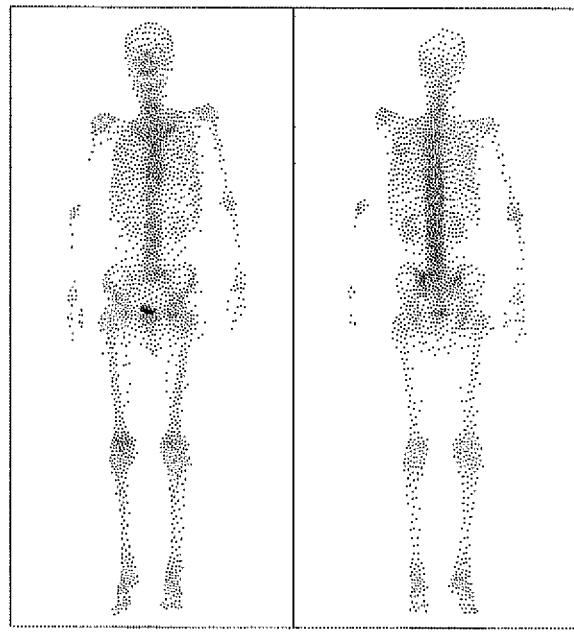
FIG. 6A is an example of displayed image data before normalization.
Figure 6B:
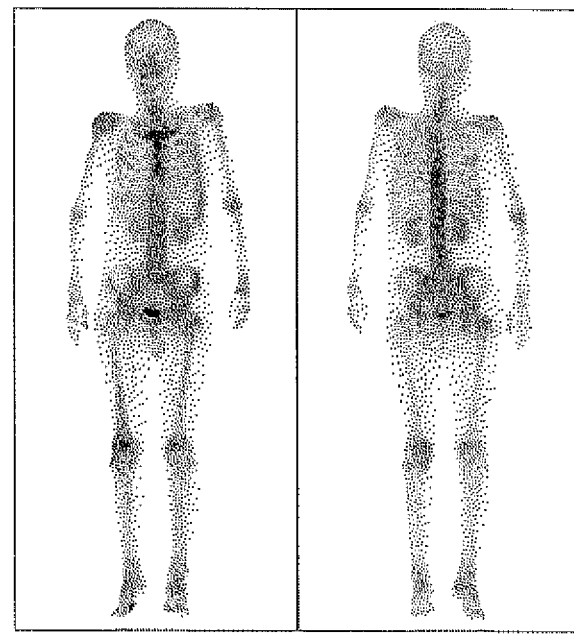
FIG. 6B is an example of displayed image data after normalization.

In step 228, the normalized image data is displayed. Examples of the displayed image data are illustrated in FIG. 6A and FIG. 6B. FIG. 6A is a display of the image data 130 before normalization. FIG. 6B is a display of the image data 130 after normalization through the processing described above. These images do not display detailed structures because image data allowed to be used for patent application is limited to binary data. In practice, high-resolution images can be displayed with multiple values in a gray scale or color format.

Figure 7A:
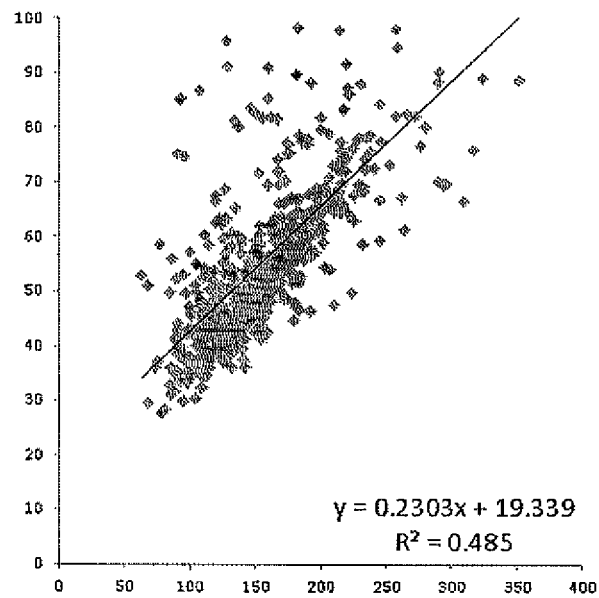
FIG. 7A is a diagram illustrating correlation between values obtained by manual normalization by a nuclear medicine specialist and values obtained by automatic normalization according to a conventional technique, with respect to a bone scintigraphy image.
Figure 7B:
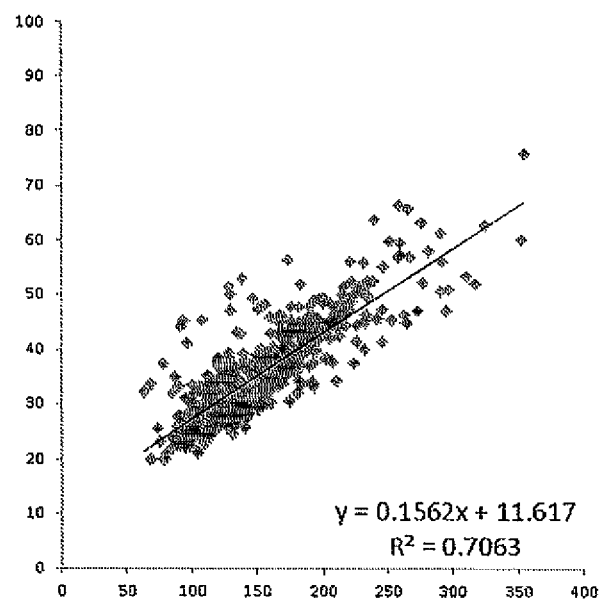
FIG. 7B is a diagram illustrating correlation between values obtained by manual normalization by a nuclear medicine specialist and values obtained by automatic normalization according to the present invention, with respect to the same bone scintigraphy image.

FIG. 7A and FIG. 7B are graphs in which values of pixels in the same image data have been plotted, where the abscissa axis indicates values normalized manually by a skilled nuclear medicine specialist, and the ordinate axis indicates values normalized automatically. In FIG. 7A, manually normalized values are compared with automatically normalized values obtained by the method of Patent Literature 1 and Non Patent Literature 1. In FIG. 7B, manually normalized values are compared with automatically normalized values obtained by the method according to the invention of the present application. By performing linear approximation on the data so as to confirm correlations, $R^2=0.485$ is obtained in the case of FIG. 7A, and $R^2=0.7063$ in the case of FIG. 7B. These results have revealed that the automatically normalized values obtained by the invention of the present application have stronger correlation with the normalized values obtained by a skilled nuclear medicine specialist. That is, the automatically normalized values obtained by the invention of the present application vary less than those values obtained by a conventional technique do.

Embodiments of the present invention have been described above with reference to preferred examples; however, the above description and the accompanying drawings are not intended to limit the scope of the present invention, but intended to satisfy the requirements of the Japanese Patent Law. Embodiments of the present invention include a number of variations other than the embodiments provided herein. For example, any of various numeric values described in the description and the drawings is an example, and is not intended to limit the scope of the present invention.

Individual features included in the various examples that have been described in the description or the drawings are not limited to usage with examples in which these features are explicitly explained to be included, but may be used in combination with other examples that have been described herein or various specific examples that have not been described. In particular, the processes presented in the flowcharts do not necessarily need to be performed in the described order. According to the preference or needs of an executor, the processes may be performed in a changed order or in parallel, or as a plurality of blocks integrally implemented, or in a loop as appropriate. These variations are all included in the scope of the invention disclosed in the present application. The form of implementing processes does not limit the scope of the invention. The order of the description of the processes defined in the claims does not necessarily specify a mandatory order of the processes. For example, an embodiment specifying a different order of the processes and an embodiment that executes the processes in a loop are also included in the scope of the invention according to the claims. It should be noted that the applicant claims to possess the right to have a patent granted on all the embodiments not deviating from the spirit of the invention regardless of whether a patent is claimed in the current set of appended claims.

REFERENCE SIGNS LIST 100 system
104 main memory
106 large-capacity storage unit
107 display interface
108 peripheral device interface
109 network interface
120 image normalization program
130 bone scintigraphy image data

The invention claimed is:

1. A method for normalizing a bone scintigraphy image obtained by a nuclear medicine technique, the method comprising:
   reading image data representing the bone scintigraphy image;
   creating a pixel value histogram of the image data;
   setting a plurality of thresholds related to pixel values based on the pixel value histogram;
   calculating respective average pixel values for the set thresholds;
   arranging the calculated average pixel values in order from a largest value; and
   determining a reference value for normalizing the image data based on at least part of a set of the average pixel values arranged in the order, wherein
   the determining the reference value includes:

determining one straight line that approximates a region of small average pixel values out of the set of the average pixel values arranged in the order in a two-dimensional coordinate in which one axis corresponds to the order and the other axis corresponds to the average pixel value, wherein the region of small average pixel values corresponds to a region of normal accumulation in the bone scintigraphy image; and calculating the reference value based on the straight line.

2. The method according to claim 1, wherein the determining the one straight line includes removing some large average pixel values from the set of the average pixel values, calculating an approximate straight line that approximates remaining average pixel values, and calculating a correlation coefficient between the approximate straight line and a set of the remaining average pixel values used for the calculation of the approximate straight line, the method further comprising:

calculating the approximate straight line and the correlation coefficient for each variable number of the average pixel values removed, and determining the one straight line based on the calculated correlation coefficients.

3. The method according to claim 1, wherein the region of small average pixel values is determined based on a rate of change of values in the set of the average pixel values arranged in the order.

4. The method according to claim 1, wherein the reference value is determined based on an intercept of the straight line.

5. The method according to claim 1, the method further comprising normalizing the image data based on the reference value and displaying the normalized image data.

6. The method according to claim 1, wherein the setting the thresholds related to pixel values based on the pixel value histogram is performed using a multi-threshold method.

7. A system comprising:

at least one processor; and at least one non-transitory memory storing therein a program instruction, wherein the program instruction is configured to cause, when executed by the at least one processor, the system to execute operations for normalizing a bone scintigraphy image obtained by a nuclear medicine technique, the operations comprising:

reading image data representing the bone scintigraphy image;

creating a pixel value histogram of the image data;

setting a plurality of thresholds related to pixel values based on the pixel value histogram;

calculating respective average pixel values for the set thresholds;

arranging the calculated average pixel values in order from a largest value; and determining a reference value for normalizing the image data based on at least part of a set of the average pixel values arranged in the order, wherein the determining the reference value includes:

determining one straight line that approximates a region of small average pixel values out of the set of the average pixel values arranged in the order in a two-dimensional coordinate in which one axis corresponds to the order and the other axis corresponds to the average pixel value, wherein the region of small average pixel values corresponds to a region of normal accumulation in the bone scintigraphy image; and calculating the reference value based on the straight line.

8. A non-transitory computer readable medium comprising a program instruction configured to cause, when executed by at least one processor, normalizing a bone scintigraphy image, obtained by a nuclear medicine technique, comprising:

reading image data representing the bone scintigraphy image;

creating a pixel value histogram of the image data;

setting a plurality of thresholds related to pixel values based on the pixel value histogram;

calculating respective average pixel values for the set thresholds;

arranging the calculated average pixel values in order from a largest value; and determining a reference value for normalizing the image data based on at least part of a set of the average pixel values arranged in the order, wherein the determining the reference value includes:

determining one straight line that approximates a region of small average pixel values out of the set of the average pixel values arranged in the order in a two-dimensional coordinate in which one axis corresponds to the order and the other axis corresponds to the average pixel value, wherein the region of small average pixel values corresponds to a region of normal accumulation in the bone scintigraphy image; and calculating the reference value based on the straight line.

9. A system as in claim 7 wherein the determining the one straight line includes removing some large average pixel values from the set of the average pixel values, calculating an approximate straight line that approximates remaining average pixel values, and calculating a correlation coefficient between the approximate straight line and a set of the remaining average pixel values used for the calculation of the approximate straight line, the method further comprising:

calculating the approximate straight line and the correlation coefficient for each variable number of the average pixel values removed, and determining the one straight line based on the calculated correlation coefficients.

10. A system as in claim 7 wherein the region of small average pixel values is determined based on a rate of change of values in the set of the average pixel values arranged in the order.

11. A system as in claim 7 wherein the reference value is determined based on an intercept of the straight line.

12. A system as in claim 7 where the operations further comprise normalizing the image data based on the reference value and displaying the normalized image data.

13. A system as in claim 7 wherein the setting the thresholds related to pixel values based on the pixel value histogram is performed using a multi-threshold method.

14. A non-transitory computer readable medium as in claim 8 wherein the determining the one straight line includes removing some large average pixel values from the set of the average pixel values, calculating an approximate straight line that approximates remaining average pixel values, and calculating a correlation coefficient between the approximate straight line and a set of the remaining average pixel values used for the calculation of the approximate straight line, where the program instruction are configured to further cause, when executed by at least one processor:

calculating the approximate straight line and the correlation coefficient for each variable number of the average pixel values removed, and determining the one straight line based on the calculated correlation coefficients.

15. A non-transitory computer readable medium as in claim 8 wherein the region of small average pixel values is determined based on a rate of change of values in the set of the average pixel values arranged in the order.

16. A non-transitory computer readable medium as in claim 8 wherein the reference value is determined based on an intercept of the straight line.

17. A non-transitory computer readable medium as in claim 8 where the program instructions are configured to further cause, when executed by at least one processor normalizing the image data based on the reference value and displaying the normalized image data.

18. A non-transitory computer readable medium as in claim 8 wherein the setting the thresholds related to pixel values based on the pixel value histogram is performed using a multi-threshold method.

* * * * *